United States Patent
Riviére

(12)
(10) Patent No.: US 6,409,439 B1
(45) Date of Patent: Jun. 25, 2002

(54) CONVERTIBLE TOOL HOLDER FOR A MACHINE TOOL

(75) Inventor: Bertrand Riviére, Bourges (FR)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 09/685,875

(22) Filed: Oct. 11, 2000

(30) Foreign Application Priority Data

Oct. 12, 1999 (SE) .............................................. 9903654

(51) Int. Cl.[7] .................................................. B23C 1/20
(52) U.S. Cl. .................. 409/131; 279/103; 408/239 R; 409/232; 409/234
(58) Field of Search ........... 483/9, 13, 1; 409/232–234, 409/231, 131; 408/239 R, 239 A, 238; 279/103

(56) References Cited

U.S. PATENT DOCUMENTS

| | | | | |
|---|---|---|---|---|
| 3,818,797 A | * | 6/1974 | Zettler | 408/239 A |
| 4,436,463 A | | 3/1984 | Rea | 409/232 |
| 4,588,339 A | * | 5/1986 | Bilz | 483/9 |
| RE32,837 E | * | 1/1989 | Corni | 483/9 |
| 4,818,161 A | | 4/1989 | Cook | 409/233 |
| 4,856,177 A | * | 8/1989 | Takeuchi et al. | 409/234 X |

FOREIGN PATENT DOCUMENTS

| | | |
|---|---|---|
| DE | 38 38 451 | 5/1990 |
| DE | 197 39 466 | 3/1999 |
| JP | 62-251036 | 10/1987 |
| JP | 62-251037 | 10/1987 |

* cited by examiner

*Primary Examiner*—William Briggs
(74) *Attorney, Agent, or Firm*—Burns, Doane, Swecker & Matthis, L.L.P.

(57) ABSTRACT

A holder for a machine tool includes a cone-shaped base body. One end of the base body has a larger diameter than the other end and includes an annular flange extending therearound. The flange includes first and second recesses formed therein. Each recess includes a bottom surface. The first and second recesses respectively form identical first distances from the bottom surface to an outer periphery of the flange. One of the recesses includes a hole. A depth-reducing element is securable in the hole such that an outer surface of the element is disposed between the bottom surface and the outer periphery, wherein an effective depth of the recess having the depth-reducing element is shorter than an effective depth of the other recess.

9 Claims, 3 Drawing Sheets

CONVERTIBLE TOOL HOLDER FOR A MACHINE TOOL

FIELD OF THE INVENTION

The present invention relates to cone-shaped holders for a machine tools, as well as to methods for modifying such holders.

BACKGROUND OF THE INVENTION

Cone-shaped holders or fasteners for machine tools are previously known, for example, through U.S. Pat. No. 4,818,161, the disclosure of which is incorporated by reference herein. Such a holder 101, depicted in accompanying FIG. 1, comprises a cone-shaped base body 100 having an end surface of small diameter in which a bore 2 is formed, the bore 2 having an internal screw thread 3. The body 100 also includes a large diameter end into which a tool (e.g., an end mill) is to be mounted. An external annular flange 5 extends around that large-diameter end. The flange 5 has circumferentially extending external grooves 7 formed therein for enabling an automated tool holder changer (not shown) to carry the tool holder while automatically removing or inserting the tool holder relative to a spindle of a machine tool such as a milling machine. The flange 5 includes a pair of diametrically opposed recesses 9 (only one depicted in FIG. 1) which are adapted to receive a respective drive lug (not shown) rigidly mounted to the spindle in order to transmit rotary motion from the spindle to the holder.

This type of holder may be developed in accordance with different standards, such as DIN-standard or ISO-standard. Among the DIN-standard, for example, are DIN 2080 and DIN 69871 which relate to two different cones, that are extremely dimensionally close to each other. For example, said cones have the same cone angle. Nevertheless, these cones are not compatible with each other when it comes to handling of said cones during tool changing. In cones 101a made according to DIN 2080 (shown in FIG. 2) the diametrically opposed recesses 9'a, 9'b in the flange 5 have the same depth d1. On the other hand, in cones 101b made according to DIN 69871 (shown in FIG. 3) the corresponding recesses 9"a, 9"b have different depths d1, d2 in order to ensure that the holder can be mounted only in the proper orientation in the spindle. Cones according to DIN 2080 are substantially intended for manual tool changing while cones according to DIN 69871 are substantially intended for automatic tool changing.

Both DIN 2080 and DIN 69871 are provided in a metric variant and an inch variant regarding the internal thread of the recess at the small-diameter end of the cone.

There is also a cone designated ISO 297, which substantially corresponds to the cone DIN 2080. There is additionally a cone designated ISO 7388, which substantially corresponds to the cone DIN 69871.

Due to the fact that the holder 101 a has different depth characteristics for the recesses 9'a, 9'b, as compared to the depth characteristics for the recesses 9"a, 9"b of the holder 101b, it is necessary to manufacture different cone bodies to satisfy this difference. That need adds to the expense of manufacturing and the cost of inventorying a sufficient number of holders.

OBJECTS AND FEATURES OF THE INVENTION

A primary object of the present invention is to provide a holder of this general type that can be easily modified, whereby the same cone-shaped base body can be used with at least two different DIN- or ISO-standards.

Another object of the present invention is that the cone-shaped base body can be modified into metric standard or inch standard regarding the internal thread of the recess at the end of smaller diameter.

Still another object of the present invention is that cones with integral cutting tools can be utilized in more machines.

SUMMARY OF THE INVENTION

The present invention relates to a holder for a machine tool. The holder includes a cone-shaped base body having a large-diameter end and a small-diameter end, the large-diameter end including an annular flange having first and second diametrically opposite recesses formed therein. Each of the recesses includes a bottom surface. The first and second recesses include identical distances from the respective bottom surfaces to an outer periphery of the flange. One of the recesses includes a hole. A depth-reducing element is securable in the hole such that an outer surface of the element is disposed between the bottom surface and the outer periphery, wherein an effective depth of the recess having the depth-reducing element is shorter than an effective depth of the other recess.

The invention also pertains to a method of modifying a cone-shaped tool holder which includes a small-diameter end and a large-diameter end. The large-diameter end includes a flange, the flange having diametrically opposed recesses formed therein. Each recess includes a bottom surface. The recesses have identical first distances from the respective bottom surfaces to an outer periphery of the flange. The method comprises the step of inserting a depth-reducing element into a hole formed in the bottom surface of one of the recesses, wherein a second distance from the flange outer periphery to an outer surface of the depth-reducing element is less than the first distance.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
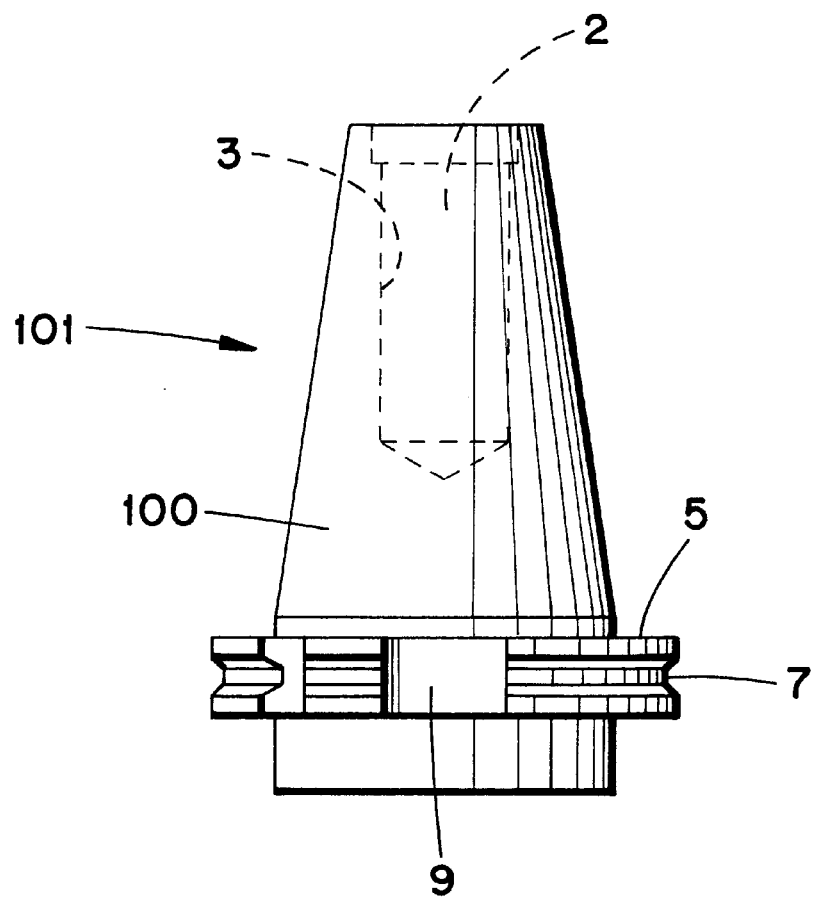
FIG. 1 is a side elevational view of a prior art tool holder for a machine tool.
Figure 8:
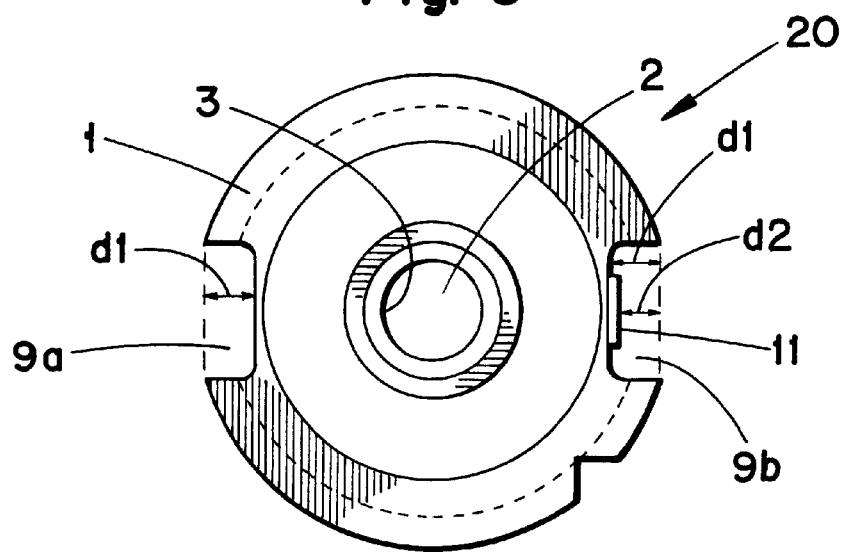
FIG. 8 is an end view of the holder depicted in FIG. 4.
Figure 7:
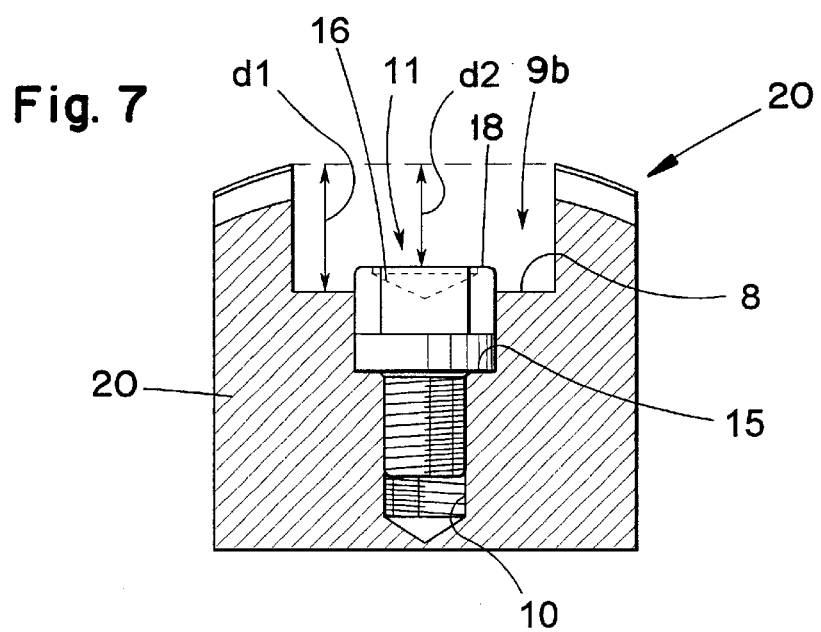
FIG. 7 is a sectional view taken along the line 7—7 of FIG. 4.
Figure 5:
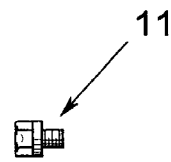
FIG. 5 is a side elevational view of a screw to be used in conjunction with the holder of FIG. 4.

In FIGS. 5, 7 and 8 there is shown a holder 20 having a cone-shaped base body 1 according to the present invention. The base body 1 is configured generally similarly to the prior base body 100 described earlier herein. That is, the base body 1 has an end surface of small diameter that is provided with a bore 2 having an internal thread 3. The base body 1 also includes a large diameter end in which a tool (not shown) is to be mounted. That large diameter end is provided with an external annular flange 5, the flange having an circumferentially extending external annular grooves 7. The flange 5 also has two diametrically opposite recesses 9a, 9b. The recesses 9a, 9b in the flange 5 have the same depth as measured from the bottom surface 8 to an outer periphery of the base body. A threaded hole 10 is provided in the bottom surface 8 of the recess 9b, and a screw 11, shown in FIG. 5, is able to be mounted in the threaded hole 10 in order to vary the effective depth of the recess 9b, as will be explained.

According to the present invention there is provided a number of sleeves 12a, 12b, 12c, 12d, all provided with identical external threads 13, which fit the internal thread 3 of the bore 2 in the base body 1 (see FIGS. 6a–6d). The sleeves 12a–12d also have respective internal threads 14a, 14b, 14c, 14d. The threads 14a and 14c are identical metric threads, while the threads 14b and 14d are identical English (inch) threads. The sleeves 12a and 12b go in pairs such that when either is provided in the bore 2 of base body 1 there will be established a design in accordance with DIN 69871 (refer to the earlier discussion in the background section).

In a corresponding manner, the sleeves 12c and 12d go in pairs and when either of these sleeves 12c and 12d is provided in the base body 1 there will be established a design in accordance with DIN 2080.

Figure 2:
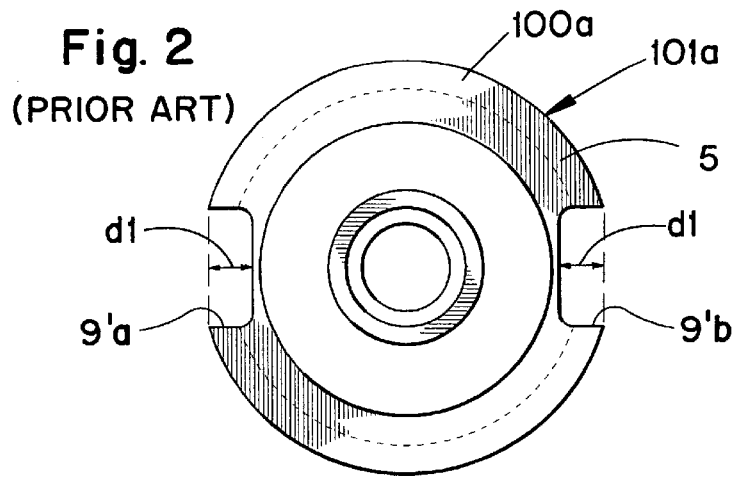
FIG. 2 is an end view of a prior art holder of the general type depicted in FIG. 1, wherein a flange of the holder is provided with recesses having identical depths in accordance with one application of the tool holder.
Figure 3:
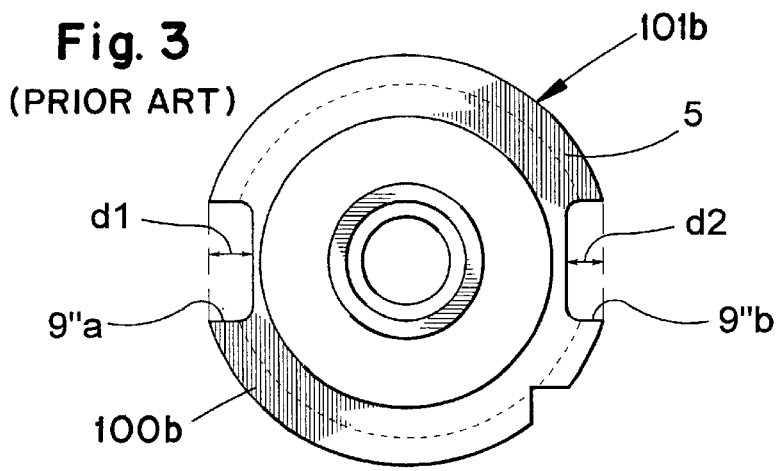
FIG. 3 is an end view of a prior art holder of the general type depicted in FIG. 1, wherein a flange of the holder is provided with recesses have different depths in accordance with a different application of the tool holder.

FIG. 2 shows an end view of a prior art cone according to DIN 2080, which is intended for manual tool changing, while FIG. 3 shows an end view of a prior art cone according to DIN 69871, which is intended for automatic tool changing. As illustrated in FIG. 2, the recesses 9'a, 9'b have the same depth d1, but as is apparent from FIG. 3, the recesses 9"a and 9"B have mutually different depths d1 and d2.

Figure 4:
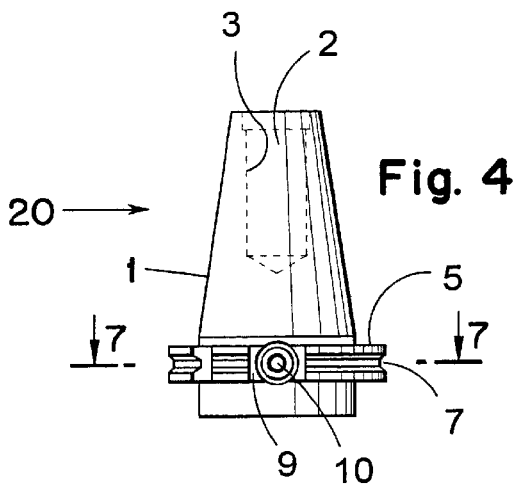
FIG. 4 is a side elevational view of a tool holder according to the present invention.
Figure 6A:
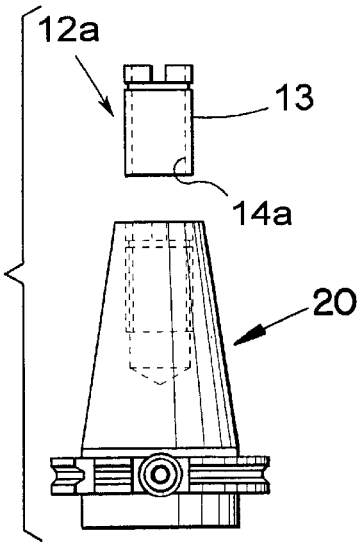
FIG. 6a is an exploded side elevational view of the holder of FIG. 4 in combination with a first type of threaded sleeve.
Figure 6B:
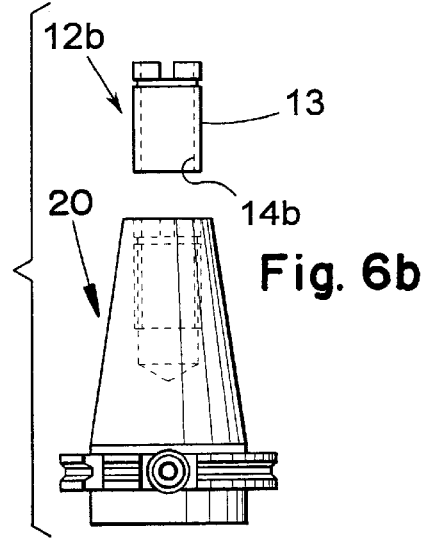
FIG. 6b is a view similar to FIG. 6a except that a different type of threaded sleeve is employed.
Figure 6C:
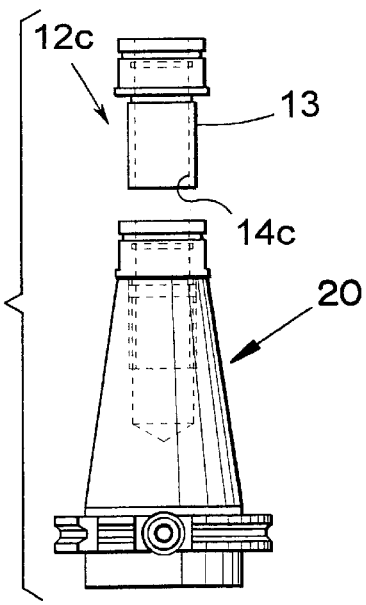
FIG. 6c is a view similar to FIGS. 6a and 6b, except that yet another type of threaded sleeve is employed.
Figure 6D:
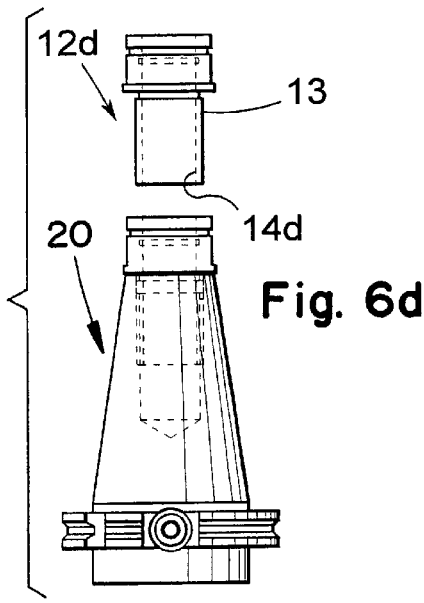
FIG. 6d is a view similar to FIGS. 6a, 6b, and 6c, except that still another type of threaded sleeve is employed.

In FIG. 7, a detail of the recess 9b of the base body 1 according to the present invention is shown. The recess 9b is provided with the internal threaded hole 10 at its bottom surface 8, and with the screw 11 mounted in said hole 10. (The screw 11 can hold an information chip if desired.) As is apparent from FIG. 4, the hole 10 is provided with a shoulder 15, against which the head 16 of the screw 11 abuts. By adapting the axial length of the head 16 in relation to the distance d1 between the bottom surface 8 of the recess 9 and the shoulder 15 it is ensured that the free end surface 18 of the screw 11 head projects an appropriate distance beyond the recess 9 bottom surface 8, to achieve a reduction of the depth of the groove 9b by a desired amount. Consequently, by placing the depth-reducing screw 11 in the manner shown in FIG. 7 a DIN 2080 cone has been converted into to a DIN 69871 cone, i.e., the operative depth of the recess 9b has been reduced from d1 to d2. Stated another way, with the depth-reducing screw 11 omitted, the base body 1 corresponds to the prior art base body 101a of FIG. 2, whereas with the screw 11 inserted, the base body 1 corresponds to the prior art base body 101b of FIG. 3.

Conceivable Modifications of the Invention

In the embodiments of the present invention described above the screw 11 is anchored in the base body 1 by means of a thread joint. Within the scope of the present invention alternative manners of securing the screw 11 in the base body can be possible. As an exemplifying non-limiting alternative can be mentioned that said securing can made by means of a bayonet coupling.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A holder for a machine tool, comprising:

a cone-shaped base body having a large-diameter end and a small-diameter end, both such ends being intersected by a longitudinal axis of the body, the large-diameter end including an annular flange having first and second diametrically opposite recesses formed therein, each of the recesses extending completely through the respective flange in a direction generally parallel to the longitudinal axis and being open radially, each of the recesses including a radially outwardly facing bottom surface, the first and second recesses respectively forming identical first distances from the bottom surface to an outer periphery of the flange, one of the recesses including a blind hole formed in the bottom surface thereof; and a depth-reducing element securable in the blind hole such that a radially outwardly facing outer surface of the element is disposed between the bottom surface and the outer periphery, wherein an effective depth of the recess having the depth-reducing element is shorter than an effective depth of the other recess.

2. The cone-shaped fastener according to claim 1 wherein the depth-reducing element includes a screw thread, and the hole comprises a threaded hole for receiving the screw thread.

3. The cone-shaped fastener according to claim 1 wherein the hole includes a shoulder spaced from the bottom surface, the depth-reducing element including a head for engaging the shoulder.

4. The cone-shaped fastener according to claim 1 wherein the small-diameter end of the base body includes a bore extending along the longitude axis.

5. The cone-shaped fastener according to claim 4 wherein the bore includes an internal screw-thread, and further including a sleeve having an external screw-thread received in the bore.

6. The cone-shaped fastener according to claim 5 wherein the sleeve includes an internal metric thread.

7. The cone-shaped fastener according to claim 5 wherein the sleeve includes an internal English thread.

8. A method of modifying a cone-shaped tool holder, the cone-shaped tool holder including a small-diameter end and a large-diameter end, the large-diameter end including a flange, the flange having diametrically opposed recesses formed therein, each recess including a radially outwardly facing bottom surface, the recesses being open radially and having identical first distances from the respective bottom surfaces to an outer periphery of the flange, the method comprising the step of inserting a depth-reducing element into a blind hole formed in the bottom surface of one of the recesses and rotating the depth-reducing element relative to the holder to secure the element in the hole, wherein a second distance from the flange outer periphery to a radially outwardly facing outer surface of the depth-reducing element is less than the first distance.

9. The method according to claim 8 wherein the depth-reducing element comprises a screw and the hole includes screw threads, the rotating step comprising screwing the screw into the hole until the screw bottoms-out.

* * * * *